INVENTOR.
August Gunnar Ferdinand Wallgren
BY
Jarvis C. Marble
his ATTORNEY.

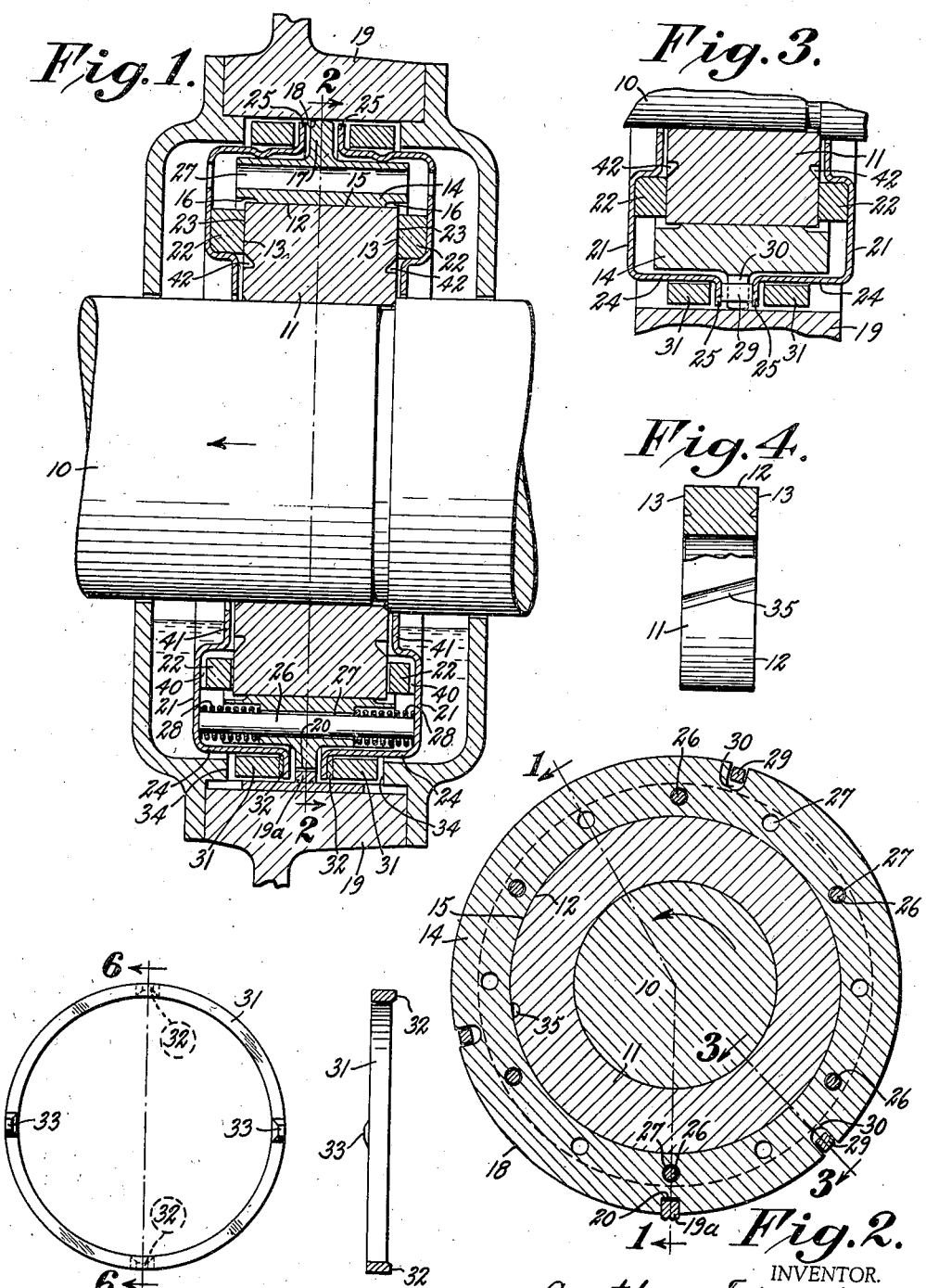

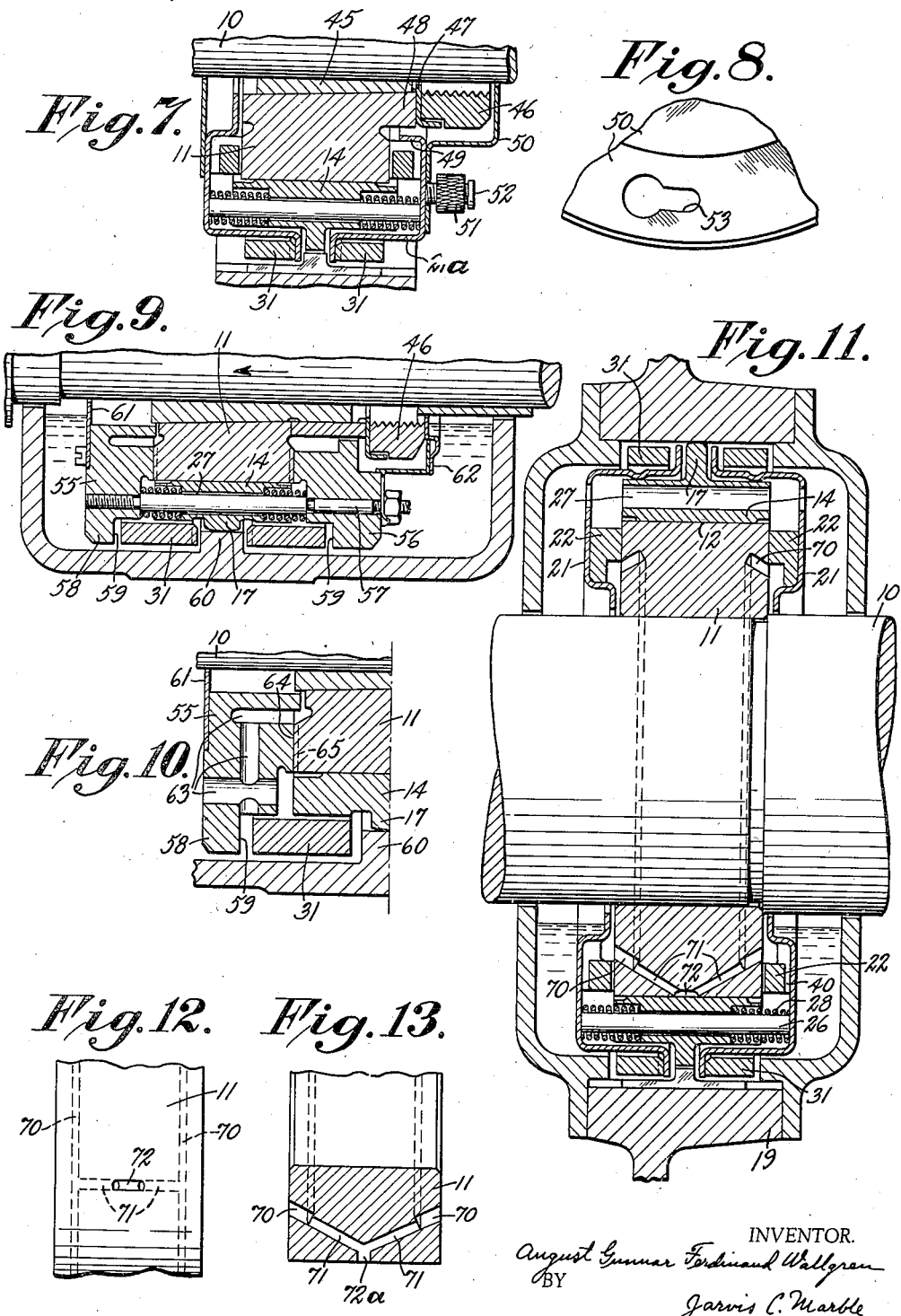

Feb. 21, 1939.    A. G. F. WALLGREN    2,148,144
BEARING
Filed Sept. 7, 1935    4 Sheets-Sheet 4
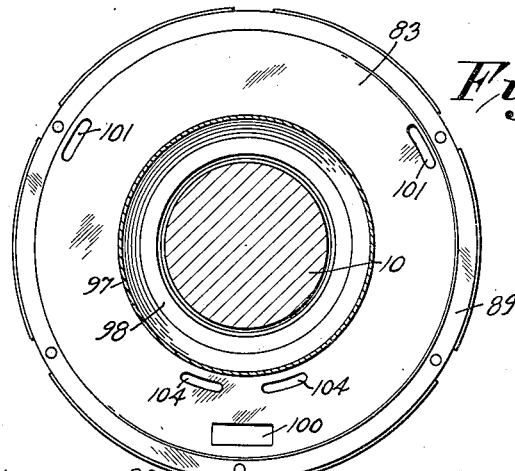
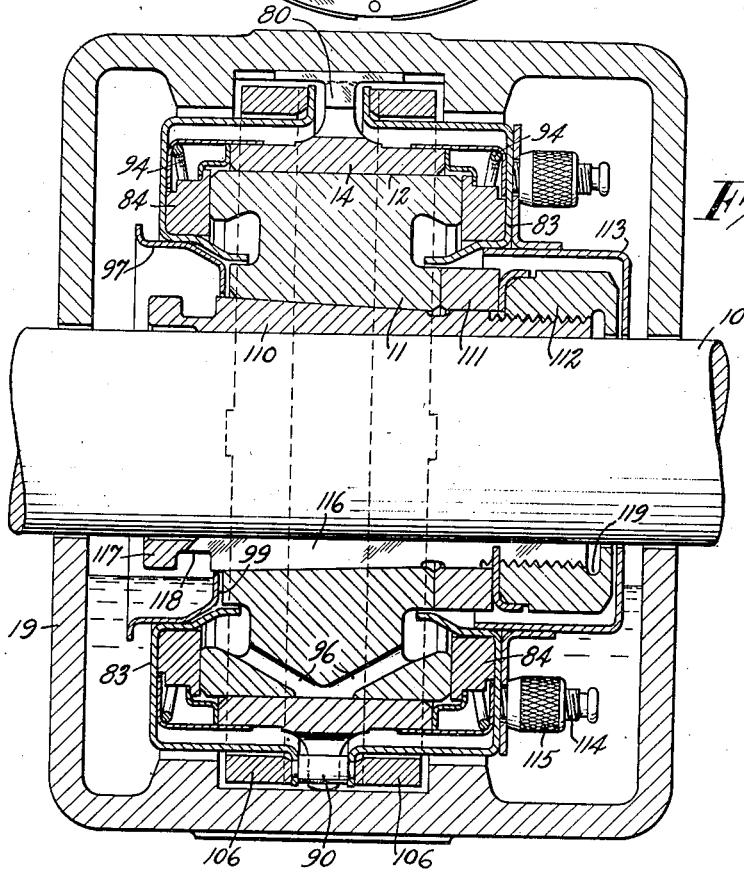
INVENTOR.
August Gunnar Ferdinand Wallgren
BY Jarvis C. Marble
his ATTORNEY.

Patented Feb. 21, 1939

2,148,144

UNITED STATES PATENT OFFICE 2,148,144

BEARING

August Gunnar Ferdinand Wallgren, Stockholm, Sweden, assignor, by mesne assignments, to Aktiebolaget Nomy, Lidkoping, Sweden, a corporation of Sweden Application September 7, 1935, Serial No. 39,533
In Sweden September 12, 1934

27 Claims. (Cl. 308—36.1)

My invention relates to bearings and more particularly to a combined radial and thrust bearing.

One of the objects of my invention is to provide a bearing of this type in which the thrust loads have no effect on the bearing surfaces designed to carry radial loads, but such thrust loads are taken entirely by thrust bearing members. Another object of my invention is to provide improved means for lubricating a bearing of this type.

Still further objects of my invention are to provide improved lubricant sealing means for preventing escape of lubricant from the bearing and to provide means for preventing accumulation of lubricant foam on the surface of the lubricant in the bearing housing.

Still another object of my invention is to provide a bearing of this type which may be mounted in standard bearing housings without requiring any alterations of the latter.

Further objects and advantages of my invention will be apparent from the following description considered in connection with the accompanying drawings which form a part of this specification and of which:

Fig. 1 is a cross-sectional view of one embodiment of my invention, and is taken on the line 1—1 of Fig. 2;

Fig. 2 is a cross-sectional view taken on the line 2—2 of Fig. 1;

Fig. 3 is a cross-sectional view of a portion of the bearing and is taken on the line 3—3 of Fig. 2;

Fig. 4 is a view, partially in cross-section, of a bearing member shown in Figs. 1 through 3;

Fig. 5 is an end view of a Cardan ring employed in the bearing;

Fig. 6 is a cross-sectional view taken on the line 6—6 of Fig. 5;

Fig. 7 is a cross-sectional view, similar to Fig. 3, of a portion of a bearing in accordance with a second embodiment of my invention;

Fig. 8 is an end view of a part of the bearing shown in Fig. 7;

Fig. 9 is a cross-sectional view of a third embodiment of my invention;

Fig. 10 is a cross-sectional view of the bearing shown in Fig. 9 and shows lubricant passages;

Fig. 11 is a cross-sectional view of a bearing similar to that shown in Fig. 1 but with different lubricating means;

Fig. 12 is a partial view of a bearing member shown in Fig. 11;

Fig. 13 is a cross-sectional view of the bearing member showing a slightly different embodiment of my invention;

Fig. 16 is an end view of the bearing shown in Fig. 14; and

Fig. 17 is a cross-sectional view of still another embodiment of my invention.

Figure 14:
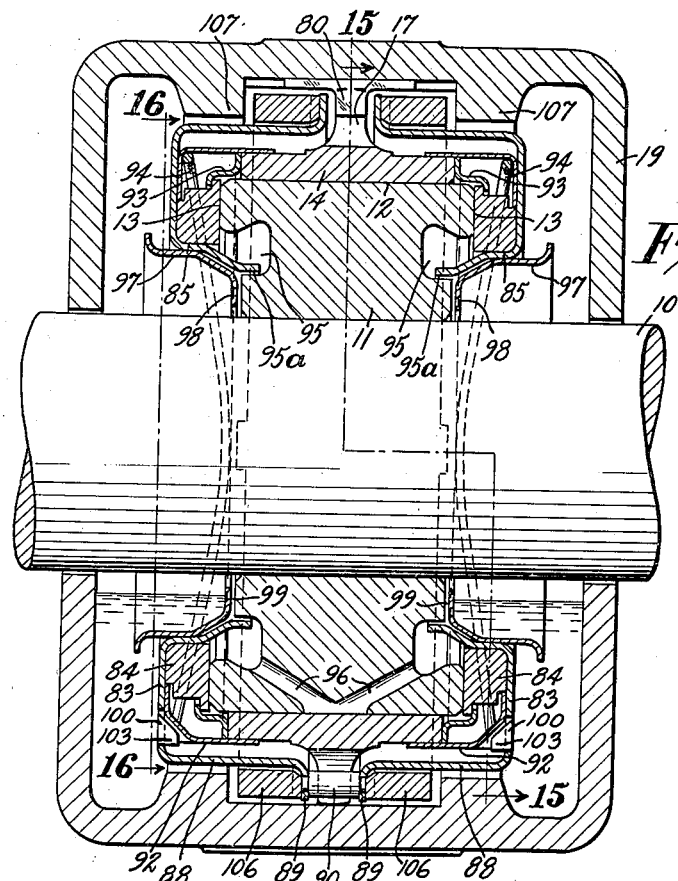
Fig. 14 is a cross-sectional view of a still further embodiment of my invention.

Referring more particularly to Figs. 1 through 6, reference character 10 designates a rotatable shaft subjected to both radial and thrust loads. Rigidly secured to shaft 10 in any suitable manner, as by shrinking, is rotatable bearing member 11. Member 11 is formed with a cylindrical radial bearing surface 12 and oppositely disposed plane thrust bearing surfaces 13. Concentric with member 11 is a rotationally stationary radial bearing member 14 having a cylindrical bearing surface 15 cooperating with the bearing surface 12 on member 11. By reason of the grooves 16 in member 14, the bearing surface 15 has less axial extent than the bearing surface 12 on member 11. This permits axial displacement of the two members within limits without altering the area of the operative bearing surfaces.

Bearing member 14 is formed with a centrally located outwardly extending annular projection 17, the periphery of which is formed as a curved surface 18. This curved surface is preferably spherical or barrel-shaped. Surface 18 on the loaded side of the bearing rests on the inner cylindrical surface of a bearing housing 19. This permits tilting of member 14 in case shaft 10 is slightly out of alignment. Projection 17 is formed with a recess 20 which receives a key 19a received in housing 19 which prevents rotation of member 14 with respect to the housing.

Disposed on either side of bearing members 11 and 14 are hood members 21. Secured within the hood members, as by spot-welding, are thrust bearing rings 22 having thrust bearing surfaces 23 cooperating with the thrust bearing surfaces 13 on member 11. Hood members 21 are formed with axially extending flanges 24 which are disposed between bearing member 14 and the bearing housing. Radially extending flanges 25 are formed on axial flanges 24 and lie adjacent to the projection 17 on bearing member 14. The hood members on the opposite sides of the bearing are connected together by means of a plurality of pins 26 extending freely through apertures 27 formed in bearing member 14. In the embodiment shown six of these pins are employed, whereas the bearing member is formed with twelve apertures 27. The apertures unoccupied by pins serve to permit the flow therethrough of lubricant from one side of the bearing to the other. Pins 26 are surrounded by springs 28. One end of each spring bears against a hood member while the other end bears against the bearing member 14. Hood members 21 are further connected together by means of pins 29 which are secured to flanges 25 and extend through recesses 30 formed in projection 17 of bearing member 14. It will be noted that pins 26 and 29 are of such length that flanges 25 are spaced a distance from projection 17. This distance determines the amount of axial displacement possible between the hood members and the bearing member 14.

Hood members 21 are supported within housing 19 by means of Cardan rings 31. As shown more particularly in Figs. 5 and 6, Cardan rings 31 are formed with diametrically opposed projections 32 on one side thereof which bear against flanges 25 on the hood members. Disposed at 90° from projections 32, and on the opposite side of ring 31, is a pair of similar projections 33. These projections bear against a face 34 formed within bearing housing 19. Cardan rings 31 permit universal movement of the hoods 21, and consequently of thrust bearing members 22, with respect to the bearing housing. This equalizes the thrust pressure around rings 22 in case of any misalignment of the shaft.

The bearing surface 12 of member 11 is formed with a diagonally extending groove 35 which serves to permit the entrance of lubricant between the bearing surfaces which lubricant, upon rotation of member 11, forms a film between the bearing surfaces. This film serves to prevent metal-to-metal contact and transmits radial load between the surfaces.

In order to supply lubricant to the radially inner periphery of the thrust bearing surfaces 13 and 23, rings 22 are formed with a plurality of passages 40. These passages are distributed around rings 22 so that, regardless of the mounting of the bearing, some of these passages will be below the surface of the lubricant in housing 19.

Hoods 21 are formed with radially extending flanges 41 which lie closely adjacent to the end surface of bearing member 11. Inasmuch as the hood members are displaced axially with the bearing member 11, the spaces between flanges 41 and the bearing member remain constant. Flanges 41 cooperate with the bearing member to form a lubricant seal which prevents the escape of lubricant to the shaft 10, along which it might be carried out of the bearing housing. Rotation of member 11 causes any lubricant seeking to pass radially inwardly toward the shaft through the space to be thrown back by centrifugal force. Grooves 42 are formed in the end spaces of member 11 and serve to permit any lubricant which is in the upper part of the bearing when rotation ceases, to return to the lower part.

If desired, thrust rings 22 may be omitted and housings 21 may be formed with thrust bearing surfaces directly thereon cooperating with the thrust bearing surfaces 13 on member 11.

The operation of the above described bearing is as follows:

Radial load acting on shaft 10 is transmitted through bearing member 11 to the lubricant film maintained between the radial bearing surfaces 12 and 15. This film in turn transmits the radial load to bearing member 14 which is supported within the bearing housing. In the event that the shaft is out of alignment and hence wobbles slightly, bearing member 14 may follow this wobbling movement by tilting on curved surface 16. This prevents any undue concentration of pressure at one edge of the radial bearing.

If the shaft 10 is subjected to thrust loads, such load is transmitted through the member 11 to one or the other of the thrust bearing surfaces 13, from which it is transmitted through the oil film to the corresponding thrust ring 22. From here the thrust is carried by the hood member 21 to the Cardan ring 31 and is finally absorbed by the bearing housing 19. Again, in case of a misalignment of the shaft, Cardan rings 31 enable the thrust bearing rings 22 to follow the wobbling of member 11. This results in an equal distribution of load around the entire bearing face of the ring.

The imposition of thrust on shaft 10 causes a slight axial displacement of this shaft, but this has no effect on the radial bearing surfaces 12 and 15 except to displace surface 12 slightly with respect to surface 15. It in no manner alters the radial load carried by the surfaces. Due to the fact that surface 15 has a slightly different extent than the surface 12, axial displacement of these surfaces may take place without changing the areas thereof available to transmit radial loads.

It will thus be seen that both the rotatable bearing member 11 and the stationary thrust bearing structure including hoods 21 and rings 22 are displaceable axially with respect to the stationary radial bearing member 14. It will be understood that this axial displacement is very slight and results from slight deformations of the parts. However, this is sufficient so that if it were allowed to act on the radial bearing surfaces it would have a serious adverse effect upon the lubricant film maintained therebetween.

In Figs. 7 and 8 there is shown another embodiment of my invention. In the bearing showing in these figures, the bearing member 11 is secured to shaft 10 by means of a conical clamping sleeve 45 and a clamping nut 46, the latter being locked by a lock washer 47. Member 11 is provided with an axial extension 48 against which the nut 46 bears. The presence of this extension necessitates a change in the shape of hood member 21a on this side of the bearing. As shown, the hood member is formed with an axially extending flange 49 which lies parallel with and closely adjacent extension 48. There is also provided a hood 50 for covering lock-nut 46 in order to prevent agitation of the oil by the rotation of the nut. Hood 50 is secured to hood member 21a by means of a nut 51 threaded on a pin 52 which is secured to hood member 21a. Pin 51 extends through a bayonet slot 53 in hood 50, the larger end of the slot being of sufficient diameter to accommodate nut 51. This makes attachment and removal of hood 50 easy when it is desired to gain access to lock-nut 46. Otherwise, the construction and operation of this modification is the same as that disclosed in Figs. 1 through 6, wherefore further explanation is not believed to be necessary.

In the embodiment shown in Figs. 9 and 10, the hood members are replaced by sleeve thrust rings 55 and 56 secured together by means of pins 57 which extend through apertures 27 in bearing member 14. The thrust rings are formed with radial projections 58 having radial surfaces 59.

Cardan rings 31 are disposed between surfaces 59 and inwardly extending annular projection 60 formed in the bearing housing. Projection 60 also serves to support projection 17 on bearing member 14.

An annular disc 61 is secured to bearing ring 55 and extends close to the shaft. A hood member 62 is secured to bearing ring 56 and encloses lock nut 46.

Lubricant is supplied to the radial and thrust bearing surfaces by means of passages 63 formed in the thrust rings 55 and 56. In this embodiment, the thrust bearing surface 64 on ring 11 is wave-shaped as is indicated by the dotted line 65. The rotation of this wave-shaped surface serves to create and maintain a lubricant film between it and the cooperating surface.

The operation of this bearing, in so far as radial loads are concerned is similar to that described above. With respect to thrust loads there is a slight difference due to the different arrangement of the Cardan rings. A thrust load acting in the direction of the arrow in Fig. 9 is transmitted from bearing member 11 to thrust ring 55 on the left-hand side of the bearing. From here the thrust is transmitted through pins 57 to the thrust ring 56 on the other side of the bearing. Thence the thrust is transmitted through the Cardan ring cooperating with thrust ring 56 to the annular projection 60 on the bearing housing.

The embodiment shown in Figs. 11 and 12 differs from that shown in Figs. 1 through 6 in the manner in which lubricant is supplied to the radial bearing surfaces. Bearing member 11 is formed with annular recesses 70 in its end faces. These recesses are preferably conical and extend from the end faces toward the radial bearing surface 12. From these recesses lubricant ducts 71 lead to a recess 72 formed in the central part of bearing surface 12. As shown in Fig. 12 recess 72 may be disposed obliquely, in a manner similar to recess 35 shown in Fig. 4. However, recess 72 does not extend entirely across the face of the bearing. In the modification shown in Figs. 11 and 12, ducts 71 communicate with opposite ends of recess 72 while in the modification shown in Fig. 13 the ducts 71 meet at the center of recess 72a.

In operation, lubricant is supplied to the space radially within thrust rings 22 through the passages 40 and this lubricant serves to lubricate thrust bearing surfaces as well as flowing into annular recesses 70 in bearing member 11. The rotation of bearing member 11 causes centrifugal force to cause flow of lubricant from recesses 70 through ducts 71 to recess 72. This flow takes place continuously and even while the duct 71 and recess 72 are above the level of the lubricant in the bearing housing. This assures a continuous and adequate supply of lubricant to the radial bearing surfaces.

Figure 15:
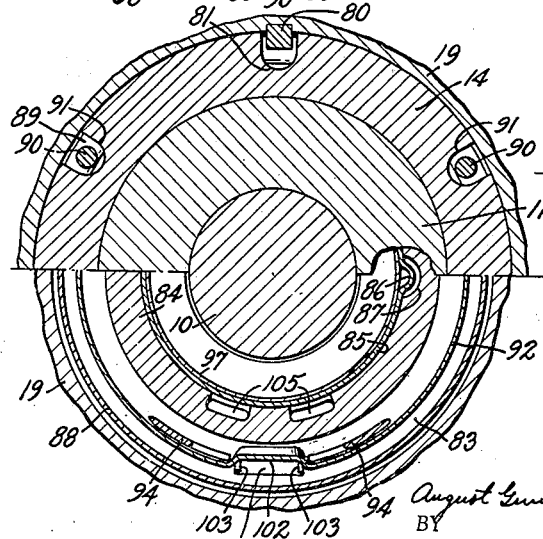
Fig. 15 is a cross-sectional view taken on the line 15—15 of Fig. 14.

In the embodiment shown in Figs. 14 through 16, reference character 10 again designates a rotatable shaft to which is rigidly secured the rotatable bearing member 11. Member 11 is formed with a cylindrical radial bearing surface 12 and oppositely disposed thrust bearing surfaces 13. The stationary radial bearing member 14 is mounted within bearing housing 19 in a manner similar to that described in connection with the bearing shown in, for instance, Fig. 1. Rotation of member 14 with respect to housing 19 is prevented by means of a key 80 received within a slot 81 formed in the periphery of the annular projection 17 on the bearing member. In this embodiment the key 80 is located at the top of the bearing instead of at the bottom.

Hood members 83 are disposed on either side of the bearing members 11 and 14 and are provided with thrust rings 84 having thrust bearing surfaces cooperating with the surfaces 13 on member 11. Hoods 83 are formed with inner axial flanges 85 having a diameter substantially the same as that of the inner diameter of rings 84. Flanges 85 center the rings 84 with respect to the hood members and ridges 86 formed in flanges 85 enter into recesses 87 in the rings 84 and prevent relative rotational movement between the rings and the hoods.

Hoods 83 are also formed with outer axial extending flanges 88 integral with which are radially extending flanges 89. Flanges 89 on the two hood members are connected together by means of a plurality of pins 90 which extend through recesses 91 formed in projection 17 of bearing member 14. Flanges 89 are spaced apart a distance which is slightly greater than the width of annular projection 17, whereby axial displacement of the hoods with respect to bearing member 14 is permitted.

Inner hood members 92 are secured within hood members 83 and have axially extending portions which overlap the ends of bearing member 14 with a certain amount of play so as to permit the flow of lubricant therebetween.

Spring-retaining rings 93 are disposed on opposite sides of bearing member 14 and are held in contact therewith by means of circular springs 94 which are bent in the manner shown in Fig. 14 so that diametrically opposite points contact rings 93 while other diametrically opposite points disposed at substantially 90° thereto contact the inner hood members 92. These springs are placed in the same relative position as are springs 28 shown in Fig. 1 and serve the same purpose, namely, to center bearing member 14 during assembly and to tend to maintain it in a proper position during operation of the bearing. The springs 94 are preferably on assembly given an initial tension.

Bearing member 11 is formed with annular recesses 95 with which communicate channels 96 leading to the cylindrical bearing surface 12. Inner axial flanges 85 of the hood member extend within recesses 95 and form lubricant seals 95a. Cup-shaped members 97 are secured within flanges 85 and are provided with radially extending flanges 98 which are disposed closely adjacent to the end surfaces of bearing member 11, thereby providing lubricant seals 99 therebetween.

Each of hood members 83 is formed with an opening 100 in the lower part thereof and preferably a plurality of openings 101 in the upper part thereof. Inner hood member 92 is formed with an opening 102 in alignment with opening 100. Wings 103 are formed at the ends of opening 100 and these wings extend into openings 102 and this assures that openings 100 and 102 are in alignment. Hood members 83 are provided with further openings 104 in the lower part thereof which communicate with openings 105 formed in ring members 84, which openings 105 lead to annular recesses 95, whereby lubricant is supplied from outside of hood members 83 to the bearing surfaces.

Cardan rings 106 are disposed between flanges 89 on hood members 83 and annular projections 107 are formed within the bearing housing in a manner similar to that disclosed in the bearing shown in Fig. 1.

The bearing above described, and shown in Figs. 14 through 16, acts in a similar manner to the bearings previously described in so far as transmission of radial and thrust loads is concerned. As above indicated, lubricant is supplied to annular recesses 95 through openings 104 in the hood members and through openings 105 in thrust rings 84. From here lubricant is supplied by centrifugal force through passages 96 to the radial bearing surfaces. Lubricant is also supplied from recesses 95 to the thrust bearing surfaces. Inasmuch as all of the rotating parts of the bearing are enclosed within inner hood members 92 oil and oil foam produced by agitation of the oil is prevented from being freely thrown out by centrifugal force to the annular space between hood members 83 and stationary bearing member 14. Oil thus enters that space in an even flow and from there the oil passes out through openings 100 which are below the oil level to the outer bearing housing. I have found that oil foam does not accumulate on the surface of the lubricant in the bearing housing proper where it might otherwise accumulate especially at high revolutions until it reached the rotating shaft to which it would adhere and possibly be carried out of the bearing housing. Without the inner hood members 92 a rotating ring of oil and oil foam might be formed also in the annular space between hood members 83 and bearing member 14 and in this way restrain an equalization of the oil level on opposite sides of the bearing through openings 100 in hoods 83.

Passage of lubricant from recesses 95 to the shaft 10 is prevented by the lubricant seals 95a and 99. The openings 101 in the upper part of hoods 83 provide for an equalization of pressure on opposite sides of the bearing. Unequal pressure might be built up if the bearing were used in a machine having a fan which produced an axially directed flow of air. If not equalized, this pressure difference would result in a difference in the level of the lubricant on opposite sides of the bearing and might force the level up on one side until the lubricant contacted the shaft.

The embodiment shown in Fig. 17 differs from that shown in Figs. 14 through 16 chiefly in the fact that the bearing member 11 is secured to the shaft by means of a tightening sleeve 110. A spacing ring 111 is placed between bearing member 11 and a locking nut 112 in order to increase the accessibility of the nut. Hood member 83 at this side of the bearing is not provided with a cup-shaped member 97 as is the hood on the other side, but a shield 113 which covers nut 112 may be secured thereto by means of a threaded pin 114 and nut 115 in much the same manner as disclosed in Fig. 7.

Sleeve 110 is split as is shown at 116 in order to be resilient for clamping purposes. The resulting axially extending groove is apt to collect lubricant, particularly when the bearing is rotating at low speeds so that centrifugal force does not act to prevent the flow of lubricant through seal 99. In order to prevent this lubricant from flowing to the shaft 10, the sleeve is formed with an unsplit extension 117 and an annular groove 118. Thus any lubricant flowing axially through the slit in sleeve 110 flows into groove 118 and is thrown back into the lubricant in the housing by extension 117. Nut 112 may be formed with an inner groove 119 which acts as an oil lock for lubricant flowing through the slit in the sleeve in this direction.

It is not believed that a further description of the operation of the bearing shown in Fig. 17 is necessary as it operates in a manner similar to Figs. 14 through 16 with the exceptions above noted.

While I have shown and described several embodiments of my invention, it is to be understood that this has been done for purposes of illustration only and that further embodiments, and modifications thereof, fall within its scope, which is limited only by the appended claims when considered in connection with the prior art.

I claim:

1. In a combined radial and thrust bearing, means providing rotatable radial bearing surface and rotatable thrust bearing surface, a first rotationally stationary member formed with radial bearing surface, and a rotationally stationary hood member disposed at one side of said means and formed with thrust bearing surface and having a portion spaced axially closely to said means to form a lubricant seal therewith, said means being axially displaceable together with said hood member with respect to said first member, whereby the space between said hood and said means is maintained substantially constant.

2. In a combined radial and thrust bearing, a rotatable bearing member formed with radial bearing surface and oppositely disposed thrust bearing surfaces, a rotationally stationary radial bearing member cooperating with the rotatable radial bearing surface, and rotationally stationary hood members enclosing said rotatable bearing member and formed with thrust bearing surfaces cooperating with the rotatable thrust bearing surfaces and having portions spaced closely to said rotatable bearing member to form lubricant seals therewith, said rotatable bearing member being axially displaceable together with said hoods with respect to said stationary radial bearing member, whereby the spaces between said portions and said rotatable bearing member are maintained substantially constant.

3. In a combined radial and thrust bearing, a rotatable bearing member formed with radial bearing surface and oppositely disposed thrust bearing surfaces, a rotationally stationary radial bearing member cooperating with the rotatable radial bearing surface, rotationally stationary hood members disposed on either side of said rotatable bearing member and provided with thrust bearing surfaces cooperating with the rotatable thrust bearing surfaces, and means for securing said hood members together, said rotatable bearing member and said hood members being axially movable independently of said stationary radial bearing member.

4. In a combined radial and thrust bearing, a stationary bearing support, a rotatable bearing member formed with radial bearing surface and oppositely disposed thrust bearing surfaces, a rotationally stationary radial bearing member cooperating with the rotatable radial bearing surface, rotationally stationary thrust bearing members cooperating with the rotatable thrust bearing surfaces, said rotatable bearing member and said stationary thrust bearing members being axially movable with respect to said stationary radial bearing member, resilient means between said stationary thrust bearing members and said stationary radial bearing member, and means for transmitting thrust from said stationary thrust members to said bearing support independently of said resilient means.

5. In a combined radial and thrust bearing, a rotatable bearing member formed with radial bearing surface and oppositely disposed thrust bearing surfaces, a rotationally stationary radial bearing member cooperating with the rotatable radial bearing surface, rotationally stationary hood members disposed on either side of said rotatable bearing members and provided with thrust bearing surfaces cooperating with the rotatable thrust bearing surfaces, means for securing said hood members together, said rotatable bearing member and said hood members being axially movable with respect to said stationary radial bearing member, and resilient means between said hood members and said stationary radial bearing member.

6. In a combined radial and thrust bearing, a housing, a rotatable bearing member having radial bearing surface and oppositely disposed thrust bearing surfaces, a rotationally stationary radial bearing member cooperating with the rotatable radial bearing surface, the last mentioned member being formed with a spherical supporting surface for rockably mounting said last mentioned member in said housing, rotationally stationary thrust bearing members cooperating with the rotatable thrust bearing surfaces, said rotatable bearing member and said stationary thrust bearing members being axially movable with respect to said stationary radial bearing member, and spring means between said stationary thrust bearing members and said stationary radial bearing member.

7. In a combined radial and thrust bearing, a housing, a rotatable bearing member having radial bearing surface and oppositely disposed thrust bearing surfaces, a rotationally stationary radial bearing member cooperating with the rotatable radial bearing surface, the last mentioned member being formed with an annular outwardly extending centrally located projection having a curved surface for tiltably supporting said last mentioned member in said housing, rotationally stationary hood members disposed on either side of said rotatable bearing member and provided with thrust bearing surfaces cooperating with the rotatable thrust bearing surfaces, said hood members enclosing said stationary radial bearing member and being formed with flanges spaced slightly from said annular projection, and means securing said hood members together, said rotatable bearing member and said hood members being movable axially with respect to said stationary radial bearing member an amount determined by the spacing of said flanges from said projection.

8. In a combination radial and thrust bearing, a housing, a rotatable bearing member having radial bearing surface and oppositely disposed thrust bearing surfaces, a rotationally stationary radial bearing member cooperating with the rotatable radial bearing surface and formed with an outwardly extending annular projection for supporting said stationary bearing member in said housing, rotationally stationary hood members disposed on either side of said rotatable bearing member and provided with thrust bearing surfaces cooperating with the rotatable thrust bearing surfaces, portions of said hood members extending within the space between said stationary bearing member and said housing on either side of said projection, and universal movement means for supporting said hood members from said housing disposed in said space.

9. In a combination radial and thrust bearing, a rotatable bearing member having radial bearing surface and oppositely disposed thrust bearing surfaces, a rotationally stationary radial bearing member cooperating with the rotatable radial bearing surface, rotationally stationary hood members disposed on either side of said rotatable bearing member and rings secured to said hood members and formed with thrust bearing surfaces cooperating with the rotatable thrust bearing surfaces, said rings being formed with passages for admitting lubricant to the radially inner parts of said thrust bearing surfaces.

10. In a bearing, a rotatable member having a bearing surface, a rotationally stationary member having a bearing surface, said rotatable member being axially displaceable with respect to said rotationally stationary member, a hood disposed at the side of said members and defining a lubricant chamber adjacent to said bearing surfaces, said hood having a portion spaced axially closely to said rotatable member to form a lubricant seal therewith, and means for mounting said hood so that it is rotationally stationary with respect to said rotationally stationary member and is displaceable axially together with said rotatable member, whereby the axial space between said hood and said rotatable member is maintained constant.

11. In a bearing, a rotatable member having a bearing surface, a rotationally stationary member having a bearing surface, said rotatable member being axially displaceable with respect to said rotationally stationary member, a hood disposed at the side of said members and defining a lubricant chamber adjacent to said bearing surfaces, said hood having a portion spaced axially closely to said rotatable member to form a lubricant seal therewith, means for mounting said hood so that it is rotationally stationary with respect to said rotationally stationary member and is displaceable axially together with said rotatable member, whereby the axial space between said hood and said rotatable member is maintained constant, and means for restraining said hood against radial movement with respect to both of said members.

12. In a combined radial and thrust bearing, a rotatable member having radial bearing surface at the periphery and thrust bearing surface at the end thereof, a rotationally stationary member having radial bearing surface, a hood disposed at the side of said members and provided with thrust bearing surface, said hood forming a lubricant chamber adjacent to said bearing surfaces and having a portion spaced closely to said rotatable member to form a lubricant seal therewith, and means for mounting said hood so that it is axially displaceable with said rotatable member and with respect to said rotationally stationary member.

13. In a bearing, a rotatable member having a bearing surface, a rotationally stationary member having a bearing surface, said rotatable member being axially displaceable with respect to said rotationally stationary member, a hood disposed at the side of said members and defining a lubricant chamber adjacent to said bearing surfaces, said hood having a portion spaced axially closely to said rotatable member to form a lubricant seal therewith, and means for mounting said hood so that it is rotationally stationary with respect to said rotationally stationary member and is axially movable together with said rotatable member, whereby the axial space between said hood and said rotatable member is maintained constant, said rotatable member being formed with an annular groove radially outside said lubricant seal to provide a drain for lubricant from the upper part of said bearing.

14. In a bearing, a housing forming a lubricant reservoir, a rotatable bearing member, a rotationally stationary bearing member, a rotationally stationary outer hood enclosing said members within said housing, said hood being formed with a passage for the flow of lubricant from said housing to the bearing surfaces of said members, and a rotationally stationary inner hood between said outer hood and said members arranged to prevent access of lubricant foam produced by the rotation of said rotatable member to the lubricant in said reservoir.

15. In a bearing, a housing forming a lubricant reservoir, a rotatable bearing member, a rotationally stationary bearing member, a rotationally stationary outer hood enclosing said members within said housing, said hood being formed with a passage for the flow of lubricant from said housing to the bearing surfaces of said members, and a rotationally stationary inner hood defining a space between said outer hood and said rotatable member and arranged to prevent lubricant agitated by the rotation of said rotatable member from being freely thrown out from said space, said hoods being formed with communicating passages for the flow of lubricant from said space to said reservoir.

16. In a bearing, a housing forming a lubricant reservoir, a rotatable bearing member, a rotationally stationary bearing member, a rotationally stationary outer hood enclosing said members within said housing, said hood being formed with a passage for the flow of lubricant from said housing to the bearing surfaces of said members, and a rotationally stationary inner hood defining a space between said outer hood and said members and arranged to restrict agitation of oil by said rotatable bearing member to said space, said inner hood having a loose fit with said stationary bearing member whereby liquid lubricant may flow therebetween.

17. In a bearing, a housing forming a lubricant reservoir, a rotatable bearing member, a rotationally stationary bearing member, a rotationally stationary outer hood enclosing said members, said rotatable member being formed with an annular groove in the end thereof and a lubricant duct connecting said groove with the bearing surface on said rotatable member, said hood being formed with a passage for the flow of lubricant from said reservoir to said groove, and a rotationally stationary inner hood between said outer hood and said members arranged to prevent access of lubricant foam produced by rotation of said rotatable member to the lubricant in said reservoir.

18. In a combined radial and thrust bearing, a housing forming a lubricant reservoir, a rotatable member having radial and thrust bearing surfaces, a rotationally stationary member having radial bearing surface, a rotationally stationary outer hood enclosing said members, said hood being provided with a thrust bearing surface and being formed with a passage for flow of lubricant from said reservoir to said bearing surfaces, and a rotationally stationary inner hood between said outer hood and said members and radially beyond the thrust bearing surfaces, said inner hood being arranged to prevent access of lubricant foam produced by the rotation of said rotatable member to the lubricant in said reservoir.

19. In a combined radial and thrust bearing, a housing forming a lubricant reservoir, a rotatable member having radial and thrust bearing surfaces, a rotationally stationary member having radial bearing surface, a rotationally stationary outer hood enclosing said members, said hood being provided with a thrust bearing surface, said rotatable member and said hood being axially displaceable with respect to said rotationally stationary member, said hood being formed with a passage for flow of lubricant from said reservoir to said bearing surfaces, and a rotationally stationary inner hood between said outer hood and said members and radially beyond the thrust bearing surfaces, said inner hood being arranged to retain lubricant foam produced by the rotation of said rotatable member and to prevent access of said foam to the lubricant in said reservoir.

20. In a bearing, a rotatable ring member for mounting on a shaft, a rotationally stationary ring member for mounting in a bearing housing, said members having bearing surfaces, and rotationally stationary hood members on either side of said rotatable member, said hood member and said rotatable members being axially displaceable with respect to said rotationally stationary ring member.

21. In a combined radial and thrust bearing, a stationary bearing support, means providing rotatable radial bearing surface and rotatable thrust bearing surface, a rotationally stationary element formed with radial bearing surface, and a rotationally stationary hood member disposed at one side of said means and formed with thrust bearing surface, and having a portion spaced closely to said means to form a lubricant seal therewith, said hood member being axially displaceable together with said means with respect to said bearing support, whereby the space between said hood and said means is maintained substantially constant.

22. In a combined radial and thrust bearing, a stationary bearing support, means providing rotatable radial bearing surface and rotatable thrust bearing surface, a rotationally stationary element formed with radial bearing surface, a rotationally stationary hood member disposed at one side of said means and formed with thrust bearing surface and having a portion spaced closely to said means to form a lubricant seal therewith, and means for transferring thrust from said hood member to said bearing support independently of said rotationally stationary element.

23. In a sliding friction bearing for a substantially horizontal shaft, a bearing housing forming a lubricant reservoir, an outer stationary bearing ring supported in said housing, an inner rotating ring adapted to be secured to the shaft, said rings having cooperating sliding bearing surfaces, a rotationally stationary hood disposed on one side of said rings and provided with a thrust bearing surface, said inner ring having cooperating thrust bearing surface, said hood having an opening below the level of the lubricant in said reservoir to provide communication between the reservoir and the space within said hood radially within said sliding surfaces, the lateral face of said inner ring adjacent to said hood member being formed with a recess extending axially inwardly and radially outwardly to thereby form a pocket which, on rotation of the inner ring, picks up lubricant on passing below the level of the lubricant in the reservoir, and a channel in said inner ring extending from said recess to said cooperating sliding bearing surfaces.

24. In a combined radial and thrust bearing, a housing, a rotationally stationary bearing member mounted in said housing, a rotatable bearing member, said bearing members having cooperating radial bearing surface, said rotatable bearing member being formed with thrust bearing surface on a lateral face thereof, a hood member made of deformable sheet metal disposed in said housing and axially spaced from said lateral face, and an annular stiffening ring secured within said hood member and formed with thrust bearing surface cooperating with the thrust bearing surface of said rotatable bearing member, said hood member being supported from said housing so that thrust is transmitted from said hood member to said housing.

25. In a combined radial and thrust bearing, a stationary bearing support, a rotatable bearing member adapted to be mounted on a shaft, said member being formed with cylindrical radial bearing surface on the outer periphery thereof and with annular thrust bearing surfaces on either end thereof, a rotationally stationary element supported in said bearing support formed with radial bearing surface cooperating with the radial bearing surface of said member, rotationally stationary hood members disposed on either side of said rotatable bearing member and formed with annular thrust bearing surfaces cooperating with the thrust bearing surfaces on said member, and means for transferring thrust from said hood members to said bearing support independently of said bearing member.

26. In a bearing, a stationary bearing support, a rotatable bearing member formed with a radial bearing surface, a rotationally stationary bearing element formed with radial bearing surface, said rotatable bearing member being axially displaceable with respect to said bearing support, and a rotationally stationary hood member disposed at one side of said bearing member and defining an inner lubricant chamber and having a portion spaced closely to said rotatable bearing member to form a lubricant seal therewith, said hood member being arranged with respect to said rotatable bearing member so that the space between them remains substantially constant upon axial displacement of said rotatable bearing member.

27. A bearing as defined in claim 24 in which the thrust bearing surface on the annular ring has a wave shaped contour to facilitate the creation and maintenance of a lubricant film between the thrust bearing surfaces, the additional stiffness provided by said annular ring reducing deformation of said wave shaped surface.

AUGUST GUNNAR FERDINAND WALLGREN.